F. A. REICH.
HEATING DEVICE FOR MOTOR VEHICLES.
APPLICATION FILED APR. 29, 1918.
1,300,017.
Patented Apr. 8, 1919.
2 SHEETS—SHEET 2.
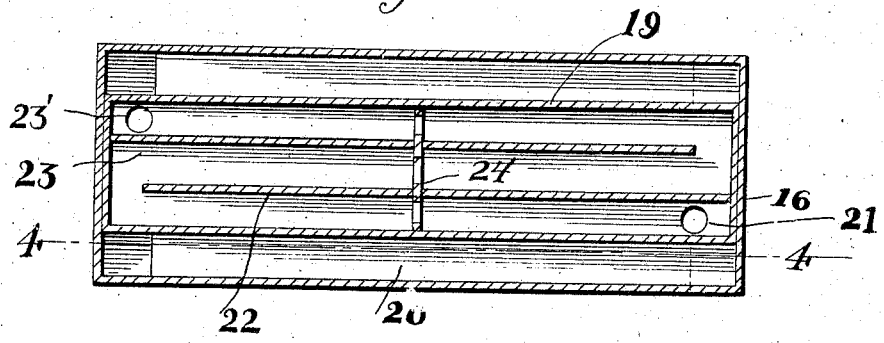
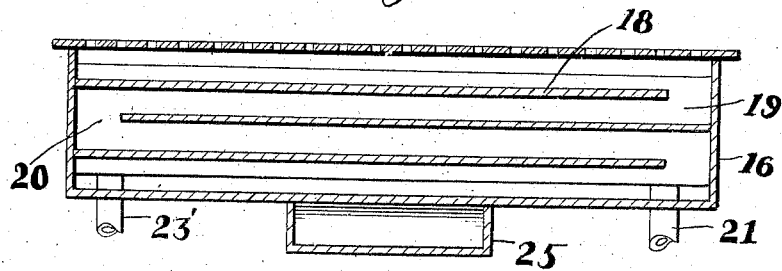
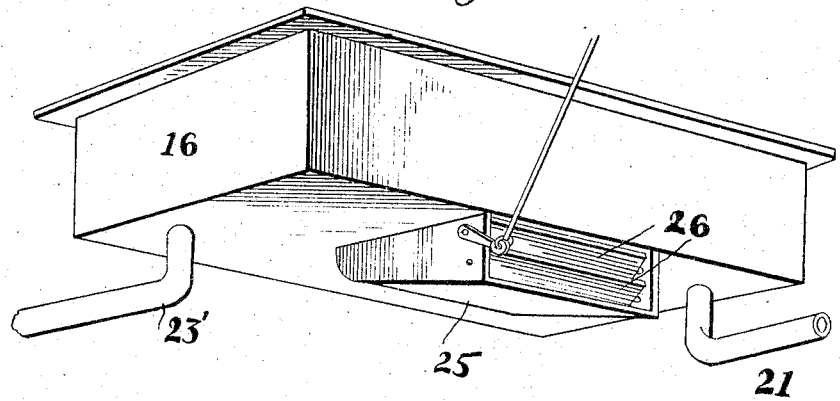
Inventor
Fred A. Reich
By Victor J. Evans,
Attorney
Witnesses

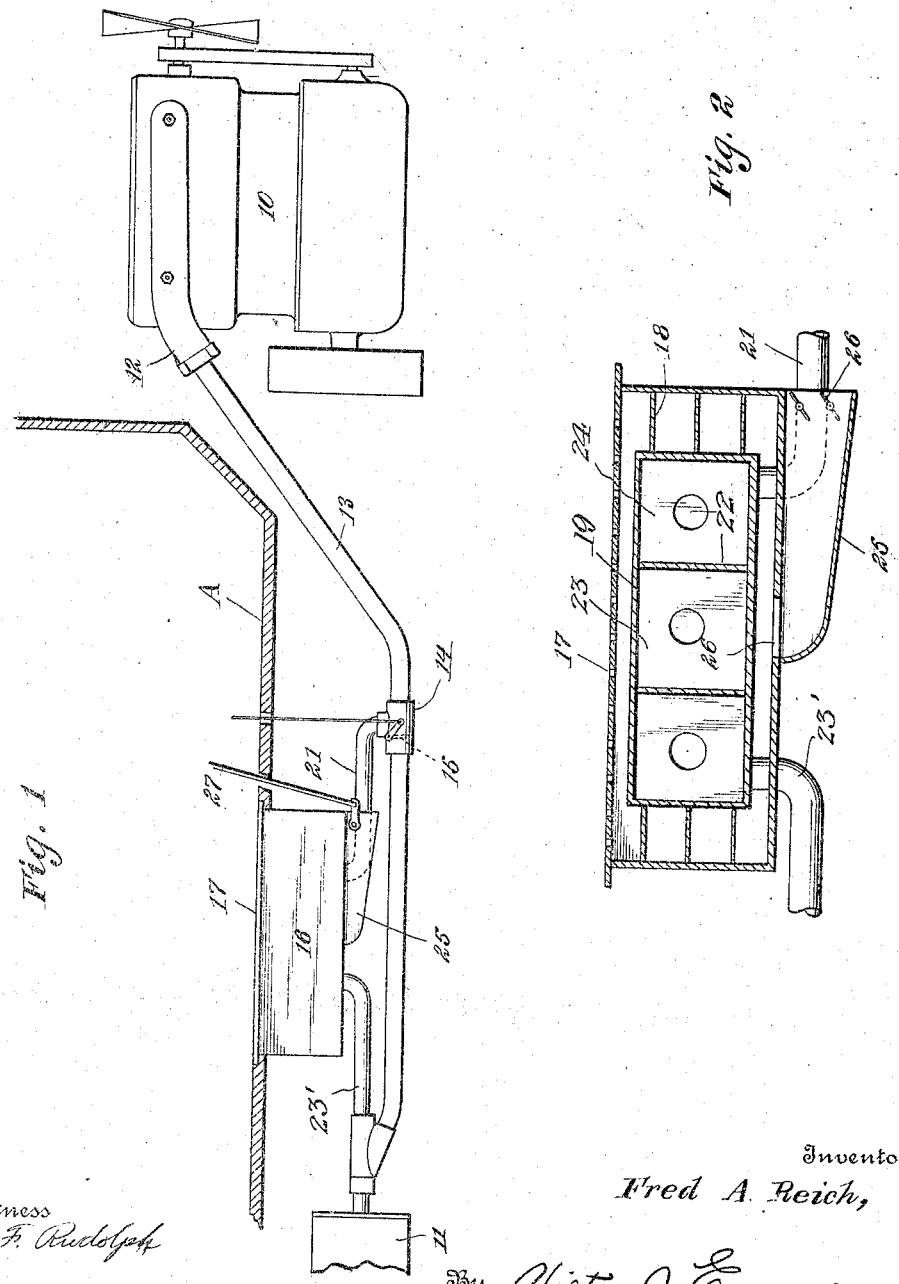

UNITED STATES PATENT OFFICE.

FRED A. REICH, OF OSHKOSH, WISCONSIN.

HEATING DEVICE FOR MOTOR-VEHICLES.

1,300,017.  Specification of Letters Patent.  Patented Apr. 8, 1919.

Application filed April 29, 1918. Serial No. 231,463.

*To all whom it may concern:*

Be it known that I, FRED A. REICH, a citizen of the United States, residing at Oshkosh, in the county of Winnebago and State of Wisconsin, have invented new and useful Improvements in Heating Devices for Motor-Vehicles, of which the following is a specification.

This invention relates to a device which when applied to a motor vehicle will enable the exhaust from the engine to be employed to heat air supplied to the interior of the vehicle by the device.

The primary object of the invention is to provide a device of this character wherein the air which is to be employed to heat the vehicle may be drawn from the exterior of the vehicle and caused to pass through a circuitous channel within a casing in which is arranged a receptacle for the hot gases from the exhaust thus, insuring the proper heating of the air before its discharge into the vehicle.

A further object of the invention is to so construct the casing through which the air is passed that the passage of the air in the casing may not only be controlled, but the air may be forced within and through the casing by the motion of the vehicle to which the device is applied.

With these and other objects in view the invention resides in the novel combination and arrangement of parts which may be hereinafter described and claimed.

In the drawing:—

Figure 1 is a longitudinal sectional view through the portion of a motor vehicle to which is shown applied a heating device constructed in accordance with the invention and partly in section.

Fig. 2 is a longitudinal sectional view of the heater casing.

Fig. 3 is a horizontal sectional view of the heater casing.

Fig. 4 is a section on line 4—4 of Fig. 3.

Fig. 5 is a detailed perspective view of the heater casing.

Like characters of reference denote corresponding parts throughout the various views in the drawing.

Referring now to the drawing in detail the letter A designates a portion of the body of a motor vehicle upon which is mounted an engine 10 and a muffler 11. The muffler 11 is connected with a short manifold 12 on the engine by a pipe 13 which is provided between its ends with a T-coupling 14 in which is mounted a valve 15.

Fixed to the floor of the motor vehicle A beneath an opening therein is a heater casing 16 the top of which is partly closed by a grating 17 disposed within the opening in the floor of the vehicle A. Extending longitudinally of the casing 16 and fixed to the opposite side walls thereof are spaced plates 18. Each of the plates 18 has one of its ends spaced from an end wall of the casing to provide upon opposite sides of a heater 19 a circuitous channel 20.

The heater 19 includes a casing which is spaced above the bottom of the casing 16 and has connected therewith a pipe 21 which is connected with one of the branches of the T-coupling 14.

Extending longitudinally of the heater 19 are partitions 22 with each partition having an end spaced from an end wall of the heater to provide the heater with a circuitous channel 23 through which the hot gases which enter the heater from the engine 10 are adapted to pass before entering a pipe 23' connected with the heater and the muffler 11.

From the above described manner of connecting the heater 19 with the exhaust manifold of the engine it will be apparent that through the operation of the valve 15 the hot gases from the engine may be caused to enter the heater at one end thereof and pass through the circuitous channel within the heater before being discharged through the pipe 23' into the muffler 11. In order that the heater 19 may coact with the muffler 11 in deadening the noise of the escaping gas from the engine 10 and also insure the thorough heating of the partitions 22 baffle plates 24 are arranged at intervals in the circuitous channel in the heater 19.

The casing 16 is provided in its bottom with a central opening 26 through which air, which is forced by the motion of the vehicle A into a duct 25 secured to the bottom of the casing 16, may enter the casing 16 and pass through the circuitous channels therein.

Mounted to turn in the front of the duct 25 are dampers 26 which may be adjusted by the operation of a rod 27 to control the quantity of air passing into the casing 16.

From the foregoing description taken in connection with the accompanying drawing it is apparent that a heating device for motor vehicles has been provided wherein a heater is provided with a casing of novel construction.

Having thus described the invention what is claimed as new is:

A device of the class described comprising an outer casing having a perforated top and an opening in its bottom, a heater casing within said outer casing and spaced therefrom, horizontal plates in said outer casing on both sides of the heater casing and forming a circuitous channel therein, vertical plates in the heater casing forming a circuitous channel therein, pipes for connecting the opposite ends of said heater casing with an exhaust pipe and means for controlling the inlet of air to the outer casing, and the products of combustion to the inner casing.

In testimony whereof I affix my signature.

FRED A. REICH.